Figure 1:
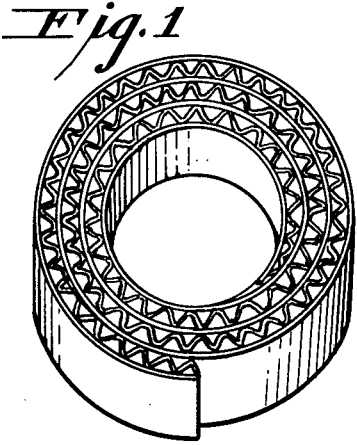

Nov. 26, 1963    R. Z. HOLLENBACH    3,112,184
METHOD OF MAKING CERAMIC ARTICLES
Filed Sept. 8, 1958

INVENTOR.
ROBERT Z. HOLLENBACH
BY Clarence R. Patty, Jr.
ATTORNEY

United States Patent Office 3,112,184
Patented Nov. 26, 1963

3,112,184
METHOD OF MAKING CERAMIC ARTICLES
Robert Z. Hollenbach, Manchester, Conn., assignor to Corning Glass Works, Corning, N.Y., a corporation of New York
Filed Sept. 8, 1958, Ser. No. 759,706
6 Claims. (Cl. 25—156)

This invention relates to a method of forming ceramic articles composed of thin-walled sections.

Present methods of forming ceramic articles, such as blowing, fusion-casting, slip-casting, pressing, drain-casting, drawing, and foaming, have been used for the production of a large variety of shapes. However, there has never been a completely successful means of forming a ceramic article with a large surface to weight ratio wherein the air spaces within could be of a predetermined size and shape and, optionally, continuous from one surface of the article to the opposite side. Articles of such configurations have extensive use as regenerators, recuperators, radiators, catalyst carriers, filters, insulation and the like, and have heretofore been made of ductile materials such as metals and alloys. While some ductile materials have properties which make them suitable for such purposes, it has been well-known that the wide variety of properties of ceramics, such as refractoriness, corrosion resistance, and low expansion, coupled with their relative low cost, would make them much more desirable for many applications. However, until now, the method of fabrication of such complex shapes from ceramic materials has been unknown.

The object of this invention is to provide means of making ceramic heat exchangers whereby the heat content of high temperature exhaust or combustion gases may be utilized to raise the temperature of the constituents of the incoming gaseous fuel mixture.

Another object of this invention is to provide means of making thin insulating material capable of withstanding a large thermal gardient across its thickness and possessing smooth exterior surfaces.

Another object of this invention is to provide means of making ceramic insulating material.

Another object of this invention is to provide a ceramic article with a high total-available-surface to weight ratio, containing a multitude of parallel channels passing through the body from one surface to the opposite surface.

Other objects will become apparent to one skilled in the art from the following description and drawings taken together with the illustrative examples which are given by way of explanation and should not be deemed to be limitations on the scope hereof. I have found that such objects can be achieved by depositing pulverized ceramic materials and a binder on a flexible carrier corrugating the coated carrier, forming an article of the desired shape from such corrugated carriers and thereafter firing the article to sinter the ceramic particles to produce a unitary structure.

Figure 4:
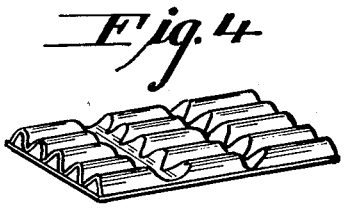
Figure 5:
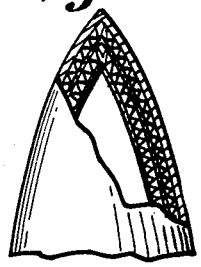
Figure 6:
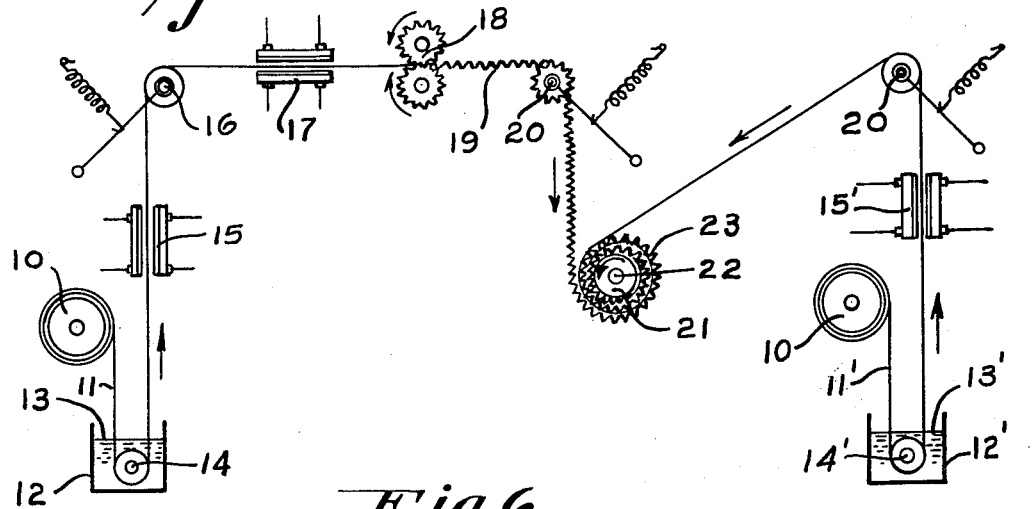

FIGS. 1 through 5 are prespective drawings which illustrate several configurations which may be imparted to articles by the method of this invention. FIG. 6 is a process diagram illustrating a suitable continuous method for producing ceramic articles according to the invention.

Any known sinterable ceramic material is suitable for the present purpose. By sinterable ceramic material, I mean an inorganic substance in the crystalline or amorphous state which can be compacted or agglomerated by heating to a temperature near, but below, the temperature at which it melts or has low enough viscosity to deform. Thus glasses, such as boro-silicates, soda-lime-silicates, lead-silicates, alumino-silicates, alkaline earth silicates, etc.; refractory compositions, such as sillimanite, magnesium silicates, magnesia, zircon, zirconia, petalite, spodumene, cordierite, corundum, alumino-silicates, etc.; and the glass-ceramics (crystalline materials made from glass), or combinations of such materials, are all suitable for the present purpose. A refractory composition consisting of 95 weight percent of petalite and 5 weight percent of talc is particularly suitable for making articles which require low thermal expansion and high thermal shock resistance. A refractory composition comprising corundum (alumina) is particularly suitable for making articles which require high-temperature stability. However, the method of the invention is not dependent upon the sinterable ceramic material selected and hence the material which has the most suitable properties for the conditions of its use may be selected.

The particle size of the ceramic material can be of any convenient dimension as dictated by the size of the desired final article and the wall thickness required.

The purpose of the binder is to bond the unfired ceramic material to the carrier, to impart green strength to the coated carrier which aids in forming the article, and to retain the formed, unfired article in the desired shape after forming and prior to firing. Thus any material having the requisite, well-known characteristics of binders, such as natural materials like gum arabic colophony and shellac, and synthetic organic resins like acrylate resins, methacrylate resins, alkyd resins, cellulose derivatives, coumaroneindene resins, epoxy resins, furan resins, polyisobutylene, isocyanate resins, phenolic resins, polyamides, polyesters, resorcinol resins, sytrene resins, terpene resins, urea resins, vinyl resins, chlorinated paraffins, melamine resins, and inroganic binders such as sodium silicate and silicone resins. Organic binders are preferred as they are removed by decomposition and volatilization when the formed article is fired to sinter the ceramic material. Furthermore, heat-curable organic binders are preferred over those which are hardened exclusively by solvent evaporation as it is easier to control curing temperature and time than the time-temperature relationship for solvent removal. (The time-temperature relationship for heat curable binders varies with each of the operable binders, but are well-known quantities for each, such information being universally published in magazines, journals, and brochures of the trade while the time-temperature relationships for the evaporation of solvents can be readily determined by experiment.)

The purpose of the carrier is to provide support for the unfired coating to allow it to be formed to the desired shape prior to sintering the ceramic coating. Carriers suitable are inorganic materials including aluminum foil, tin foil, aluminum silicate paper, copper screening, and asbestos cloth, and organic materials including cellulose acetate paper, onion skin paper, tea bag paper, nylon cloth, rayon cloth and polyethylene film. The organic film materials are preferred as they substantially decompose upon firing the formed article and produce an article consisting almost entirely of ceramic material. The inorganic films, on the other hand, remain in the final article and decrease its usefulness for some purposes, for instance, uses requiring thermal shock resistance, but in some instances beneficially react with the ceramic coating material during firing. Although films up to about $\frac{1}{16}$ of an inch thick, both organic and inorganic, have been found suitable, the only advantage realized from using thick films is the slight reinforcing action of any retained inorganic film structure. Therefore, I prefer to use much thiner films and thereby obtain thinner walls in the final article. Obviously, materials which do not have sufficient ductility to withstand crimping or are too tough to cirmp at reasonable temperatures are impractical for the present purposes.

Additionally, I prefer to use a fibrous carrier, organic or inorganic. By fibrous carrier, I mean one which is composed of a multitude of individual fibers so disposed as to form a sheet, such as cloth or paper containing a multitude of holes which pass through the carrier from one surface to the opposite surface which can be completely filled by the ceramic slurry to produce an unlaminated wall upon firing.

The binder and sinterable ceramic material may be applied to the carrier by any of the conventional means such as spraying, dipping or brushing a suspension of the ceramic material on to the carrier, or the binder and the ceramic material may be applied separately and consecutively by any such means.

The forming of the article having the desired honeycomb structure is accomplished by corrugating coated carrier of the desired size and shape and fabricating the final artcile from these corrugated carriers, prior to firing the body. By honeycomb structure, I means a unitary body having a multitude of air-containing channels of predetermined size and shape, each such space being defined by ceramic walls and each of such channels separated one from another by a wall of ceramic material. By corrugating, I means crimping or multiple-folding to achieve a concertina effect in the carrier which in cross-section presents a repeating pattern. Examples of simple patterns which are suitable are triangular, rectangular, square and sinusoidal while more complex repeating patterns are also suitable for the present purpose.

Figure 2:
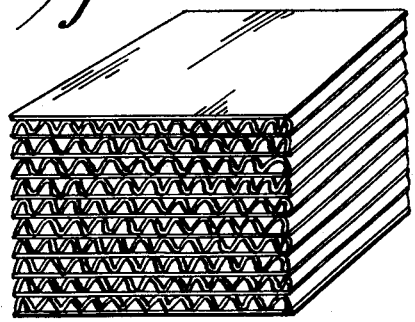
Figure 3:
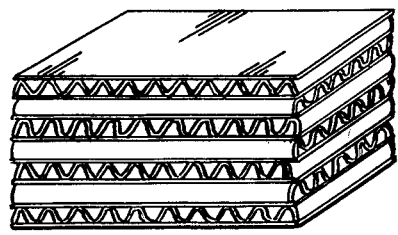

Thus structures may be fabricated by multiple layers of films corrugated with the same pattern, with alternate layers laterally disposed a distance equal to half of the width of individual pattern so that layers do not nest into each other. It is even possible to fabricate the honeycomb structure from multiple layers of films corrugated with different patterns or to introduce alternate layers of flat sheets between the corrugated layers. This latter method is especially suitable in the production of cylindrical shapes such as illustrated in FIG. 1. Although the possible combinations of structures and means for assembling them from layers of corrugated carriers is practically infinite, several configurations are illustrated in FIGS. 1 through 5. FIG. 1 illustrates an annular cylinder suitable as a rotating recuperator constructed by rolling an unfired cirmped carrier and an unfired, uncorrugated carrier adjacent thereto around a central core and thereafter firing to sinter the ceramic material. FIG. 2 represents a rectangular block suitable as a catalytic carrier constructed from alternate layers of triangularly crimped unfired coated carriers and layers of flat, unfired coated carriers and thereafter fired. FIG. 3 represnts a body which is similar to the one shown in FIG. 2 except that the longitudinal axis of the crimps of alternate corrugated carriers are at right angles to each other. In each of the articles illustrated in FIGS. 1-3, the air-containing spaces pass completely through the structure from one face, forming channels through the body.

FIG. 4, partly in section, illustrates a section of insulating board formed of a coated carrier corrugated to a triangular pattern in cross-section, the corrugations of which have been crushed at two or more points along a direction perpendicular to the longitiudnal axis of the crimps, and adfixed to an uncorrugated coated carrier. This forms a more efficient insulating means as some of the air spaces are thereby closed-off from the surrounding atmosphere. FIG. 5, partly in section, illustrates a more complex insulating shape suitable for protecting high speed projectiles and vehicles from heat of friction and formed by placing alternate layers of uncorrugated and cirmped coated carrier strips on a mandrel of the desired shape and hardening the binder in the coating by evaporating the solvent or curing and then firing to sinter the ceramic material.

The firing of the green structure or matrix is accomplished in the normal manner by placing the body in a furnace and heating it at a rate slow enough to prevent breakage due to thermal shock to a temperature high enough to cause the ceramic particles to sinter. While the heating rates and sintering temperatures are dependent upon both the ceramic materials utilized and the shape of the article formed, they are not critical conditions and suitable conditions are readily determinable by one skilled in the art of firing ceramic articles.

The preferred manner of practicing this invention is hereinafter set forth. A ceramic composition consisting of 95 parts by weight of petalite and 5 parts by weight of talc ($3MgO \cdot 4SiO_2 \cdot H_2O$) are ground and mixed in a ball mill until a particle size of −200 mesh is obtained. A solution consisting of the following composition is then added to the ball mill for each 100 grams of ceramic material:

45 g. of epoxy resin "Hysol 6111"
2.61 g. of hardener F–1
90 cc. of solvent (mixture of toluene and butyl alcohol)

The resin is an epoxy hydroxy polyether resin. The term "Hysol" in the above example is the trade name for epoxy resins supplied by Houghton Laboratories, Inc. The "Hysol 6111" is an epoxy resin solution containing 57 percent by weight of epoxy resin having a viscosity of about 2.5–4.0 poise at 25° C. The resin has an epoxide equivalent (grams of resin containing 1 g. chemical equivalent of epoxy) of 595±50, a melting range of 73–85° C. Such resins may be obtained readily on the open market as there are a number of producers supplying such resins. The hardener is a mixture of primary and secondary amines sold by Houghton Laboratories, Inc., to cure the resin upon the application of heat. "F–1" is the trade name applied to the particular hardener for curing "Hysol 6111" and it has a boiling point of 130° C. and an average molecular weight per reactive group of 31.7.

The ceramic material and the binder are further ball-milled for about three hours to produce a uniform suspension. A porous, natural cellulose paper, commonly known as 3½ pound tea bag paper, cut to a width of 4 inches is then dipped into the suspension and dried by heating to 120° C. for 2 minutes. The dried, coated paper is then heated to 180° C. and crimped to produce a pattern taken in cross-section in the shape of an isosceles triangle with legs about 0.07 inch long and an open base about 0.1 inch long. The crimped, unfired, coated paper is rolled up simultaneously with a sheet of tea bag paper of the same width, which has been coated and dried in the same manner, but not crimped, upon a 2-inch diameter reel until an annular cylinder with an outside diameter of about 22 inches is obtained.

The unfired matrix is then removed from the reel and placed in a furnace and heated slowly (about 25° C./hr.) to 400° C. and held at this temperature for about 1 hour. The matrix is then further heated up to 1200° C. at a rate of about 100° C./hr., and thence to 1250° C. at about 25° C./hr. and held at 1250° C. for about 4 hours. The sintered recuperator is then cooled to about 100° C. at furnace rate in about 16 hours and removed from the furnace.

The resulting article has about 400 channels per square inch measured in a plane perpendicular to the axis of the cylinder, a total-available-surface of about 1500 ft.$^2$/ft.$^3$, a density of about 30 pounds per cubic foot, a thermal expansion coefficient of $-1.0 \times 10^{-7}$/° C., 80% free space measured in a plane perpendicular to the axis to the cylinder.

The process diagram in FIG. 6 illustrates a means for producing an unfired matrix of the type shown in FIG. 1 according to the method of the invention. A reel 10 contains a roll of suitable film material 11 which is pulled through a vessel 12 containing a suspension 13 of finely divided, sinterable, inorganic material, a binder, and a solvent for such binder. An idler roller 14 assures that the film is completely immersed in the suspension. The film 11 then passes through a heating chamber 15 wherein the solvent is evaporated. The dried film containing the coating of inorganic material and binder thence passes over a tensioning roller 16 and through a second heating chamber 17 immediately adjacent to the crimping means 18. The crimping means corrugates the carrier in any desired pattern, and simultaneously cools the crimped carrier so that the binder holds the film in the crimped condition during further processing. The crimping means 18 is driven by a variable speed motor (not shown) which can be adjusted to control the speed at which the carrier 11 is pulled through the prior processing steps. The crimped film material 19 then passes over the tensioning roller 20 and on to the take-up reel 21 which turns on an axle 22 which is driven by a variable speed motor (not shown). Simultaneously with the manufacture of the crimped film 19, a second film 11' is processed in a similar manner except that it is not crimped, and is taken upon the same reel 21 in alternate layers with the crimped film 19. The second reel 10' contains a roll of suitable film material 11' which is pulled through a vessel 12' containing a suspension 13' of the same composition as suspension 13. Complete immersion in the suspension is assured by use of an idler roller 14'. The film 11' then passes through a heating chamber 15' which partially dries the film to a tacky condition. The film then passes over a tension roller 20' and on to the take-up reel 21; the alternate layers of the film 11' and crimped carrier 19 comprise a matrix 23 which is shown in isometric view in FIG. 1. The binder on the flat carrier has sufficient adhesiveness to hold the structure in the desired form until it is fired.

An example illustrating the use of inorganic material for both the binder and the carrier is hereinafter set forth. A suitable binder solution is prepared by mixing 93.5 weight percent of silicone oil and 6.5 weight percent of aluminum flakes. The silicone oil consists by weight of 16⅓% of monophenyl polysiloxane, 16⅓% of dimethyl polysiloxane, 16⅓% of phenylmethyl polysiloxane and 50% toluene. The binder is then mixed with minus 100-mesh borosilicate glass to produce a coating composition containing by weight 54% glass and 46% binder. The coating composition is applied to a sheet of aluminum foil about 0.00025 inch thick by painting, spraying, or dipping. The coating composition may be altered to obtain the most desirable consistency for the particular method of application by thinning with excess toluene. The coated aluminum foil is partially dried at room temperature until slightly tacky.

The forming of the article having the desired honeycomb structure is accomplished by corrugating the coated carrier and fabricating the final article from these corrugated carriers, with or without additional flat, coated carriers prior to firing the body. More specifically, strips of aluminum foil, about 8" x 2¼", coated as explained above, were corrugated to a triangular cross-section with the corrugations running across the 2¼" dimension of the strip. This produced corrugated section 1½" x 2½". Layers of such corrugated sections were stacked alternately with coated, flat sheets of carrier material to produce a body 2¼" x 1½" x 1", such as is shown in FIG. 2. This body was then fired by placing in an electric furnace at 480° C. and heated to 820° C. in 35 minutes and allowed to cool with the furnace.

What is claimed is:

1. A method of making a honeycomb ceramic article wherein the channels are of predetermined shape and size which comprises applying a suspension comprising pulverized ceramic material and a binder to each side of a flexible carrier, corrugating the coated carrier, forming the corrugated carrier into an article of the desired shape, and firing the article to sinter the ceramic particles into a unitary structure.

2. A method of making a honeycomb ceramic article wherein the channels are of predetermined shape and cross-sectional area and completely traverse the article from one face to the opposite face which comprises applying a suspension comprising pulverized ceramic material and a binder to each side of a flexible carrier, corrugating the coated carrier, forming the corrugated carrier into an article of the desired shape, and firing the article to sinter the ceramic particles into a unitary structure.

3. A method of making a honeycomb ceramic article wherein the channels are of predetermined shape and size which comprises applying a suspension comprising pulverized ceramic material and a binder to each side of a plurality of flexible carriers, corrugating at least one of the coated carriers, forming the corrugated and flat carriers into an article of the desired shape utilizing corrugated carrier and flat carrier in alternate layers, and firing the article to sinter the ceramic particles into a unitary structure.

4. A method of making a honeycomb ceramic article wherein the channels are of predetermined shape and cross-sectional area and completely traverse the article from one face to the opposite face which comprises applying a suspension comprising pulverized ceramic material and a binder to each side of a plurality of flexible carriers, corrugating at least one of the coated carriers, forming the corrugated and flat carriers into an article of the desired shape utilizing corrugated carrier and flat carrier in alternate layers, the channels formed by the corrugated carriers completely traversing the article from one face to the opposite face, and firing the article to sinter the ceramic particles into a unitary structure.

5. A method of making a honeycomb ceramic article having channels of predetermined shape and cross-sectional area completely traversing the article from one face to the opposite face which comprises applying a suspension comprising pulverized ceramic material and a binder to each side of a flexible fibrous carrier, said carrier being composed of a multitude of individual fibers so disposed as to form a sheet containing a multitude of holes which pass through the carrier from one surface to the opposite surface and which can be completely filled by the ceramic suspension, corrugating the coated carrier, forming the coated carrier into an article of the desired shape, and firing the article to sinter the ceramic particles into a unitary honeycomb structure.

6. A method of making a honeycomb ceramic article having channels of predetermined shape and size which comprises applying a suspension comprising pulverized ceramic material and a binder to each side of a plurality of flexible fibrous carriers, said fibrous carriers being composed of a multitude of individual fibers so disposed as to form a sheet containing a multitude of holes which pass through the carrier from one surface to the opposite surface and which can be completely filled by the ceramic suspension, corrugating at least one of the coated carriers but less than all of the coated carriers, forming the corrugated and uncorrugated carriers into an article of the desired shape utilizing the corrugated carrier and uncorrugated carrier in alternate layers, and firing the article to sinter the particles into a unitary honeycomb structure.

References Cited in the file of this patent
UNITED STATES PATENTS

| | | |
|---|---|---|
| 865,791 | Meier | Sept. 10, 1907 |
| 2,224,810 | Cumfer | Dec. 10, 1940 |
| 2,552,937 | Cohen | May 15, 1951 |
| 2,556,011 | Swaze et al. | June 5, 1951 |
| 2,875,501 | Gravley | Mar. 3, 1959 |
| 2,977,265 | Forsberg et al. | Mar. 28, 1961 |